Figure 1:
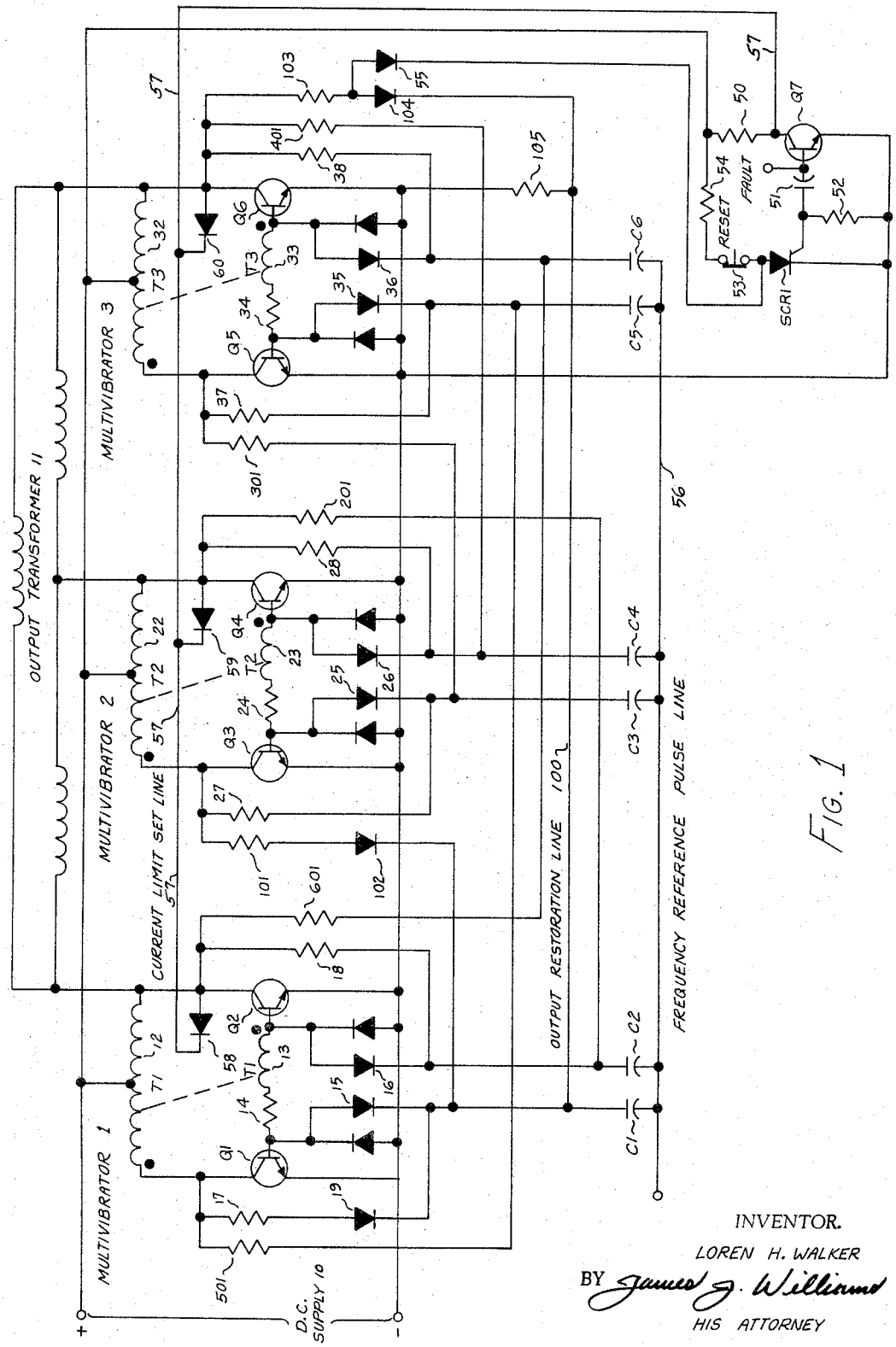

INVENTOR.
LOREN H. WALKER
BY James J. Williams
HIS ATTORNEY

United States Patent Office 3,340,455
Patented Sept. 5, 1967

3,340,455
RING COUNTER TYPE INVERTER WITH FAULT RESPONSIVE PROTECTIVE MEANS
Loren H. Walker, Waynesboro, Va., assignor to General Electric Company, a corporation of New York
Filed Feb. 15, 1965, Ser. No. 432,511
6 Claims. (Cl. 321—5)

The invention relates to a control circuit for an inverter, and particularly to a control circuit for switching the output of a multiphase, ring counter type inverter from some value to zero and back.

Multiphase static inverters of the ring counter type are used to convert direct current to alternating current. These static inverters use current control devices to switch the conduction of the direct current through output or gating transformers in a sequence or ring, and thus produce multiphase alternating current. If an overload or fault develops, the current control devices should be protected, particularly if they are of the solid state type.

Accordingly, an object of the invention is to provide a new and improved control circuit that can protect the current control devices in an inverter from overloads or faults.

Another object of the invention is to provide a new and improved control circuit for a multiphase inverter of the ring counter type, the control circuit being able to quickly reduce the output voltage to zero, and hence protect the elements of the inverter from overloads and faults.

Another object of the invention is to provide a new and improved control circuit for a multiphase inverter, the control circuit being capable of quickly reducing the inverter output volage to zero in response to an overload, and being capable of returning the inverter output voltage to its normal value in response to the overload being removed.

Briefly, these and other objects are achieved in accordance with the invention by a control circuit that is used with a multiphase inverter of the ring counter type. For each phase of the inverter, there is a pair of current control devices coupled so that one device is on and one device is off at any given time. In accordance with the invention, a respective switching element is provided for and coupled to each current control device of one phase and to the corresponding current control device of a subsequent or adjacent phase. The switching elements are all coupled to a common pulse source. When the inverter is operating normally, each pulse causes the current control devices of one phase to switch. A limit line is coupled to corresponding current control devices of each phase. If a fault or overload occurs, the limit line is operated so as to cause all of the corresponding current control devices to conduct. Thereafter, each pulse causes corresponding current control devices of each phase to switch at the same time so that no output is produced. Thus, the current control devices are protected. After the fault or overload is removed, one switching element can be coupled to a noncorresponding current control device to prevent the current control devices associated with that switching element from switching. This restores the normal operation of the inverter with the current control devices of one phase switching in response to each pulse.

Figure 2:
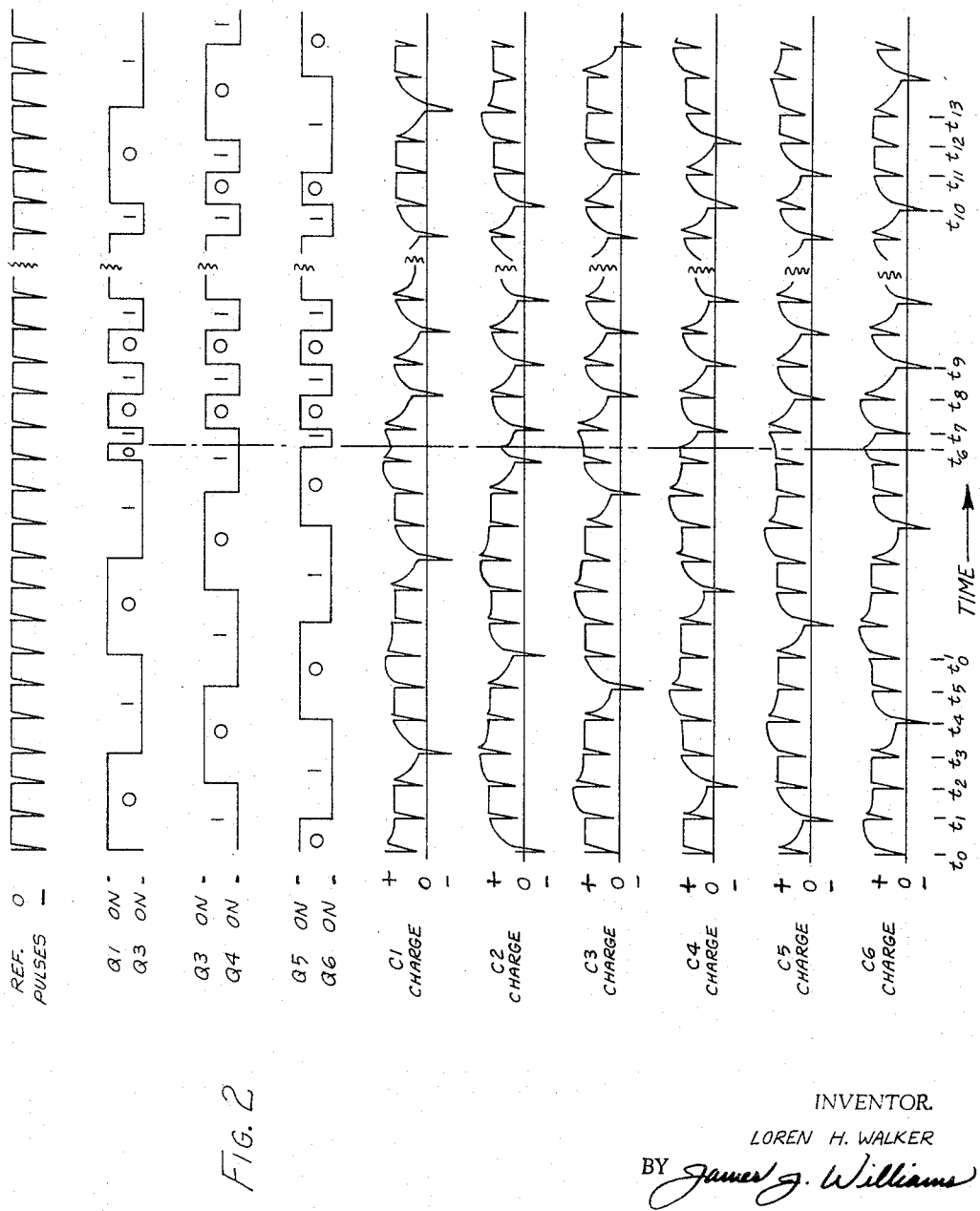

The invention is particularly pointed out in the claims. The invention may be better understood from the following description given in connection with the accompanying drawing, in which:

FIGURE 1 shows a circuit diagram of a preferred embodiment of the control circuit of the invention as used with a three-phase inverter of the ring counter type; and FIGURE 2 shows waveforms for explaining the operation of the circuit of FIGURE 1.

The inverter shown in FIGURE 1 is of the ring counter type that changes direct current from a supply 10 into three-phase alternating current at an output transformer 11. Since the inverter produces three-phase alternating current, it comprises three multivibrators which are respectively indicated. The three multivibrators respectively include transformers T1, T2, T3. The transformer T1 includes a center tapped main winding 12 coupled to a second winding 13. The transformer T2 comprises similar windings 22, 23, and the transformer T3 comprises similar windings 32, 33. The windings of each transformer are coupled as indicated by the polarity dots. The center taps of the main windings 12, 22, 32 are coupled to the positive bus, of the direct current supply, and their ends are connected to the collector electrodes of NPN type transistors Q1 through Q6. The transistors Q1, Q2 are associated wth multivibrator 1, the transistors Q3, Q4 are associated with multivibrator 2, and the transistors Q5, Q6 are associated with multivibrator 3. The emitters of the transistors Q1 through Q7 are coupled to the negative bus of the direct current supply 10. The base electrodes of the transistors of each multivibrator are coupled to each other through a respective series circuit comprising the second windings 13, 23, 33 and resistors 14, 24, 34. Diode rectifiers are respectively coupled between the base electrode of each transistor and the negative bus. The base electrodes of each of the transistors Q1 through Q6 are also respectively coupled through diode rectifiers 15, 16, 25, 26, 35, 36 to storage devices such as capacitors C1 through C6. The other ends of the capacitors C1 through C6 are coupled to a frequency reference pulse line 56 which receives negative-going pulses to switch the transistors Q1 through Q6.

Each capacitor is also coupled through a resistor to the collector of its respective transistor to sense the voltage, and hence the conduction state, of that transistor. Thus, in multivibrator 1, the capacitor C1 is coupled through a resistor 17 (and a diode rectifier 19 for reasons to be explained) to the collector of the transistor Q1. Similar connections with resistors 18, 27, 28, 37, 38 (but without the rectifier) are made between the capacitors C2, C3, C4, C5, C6 and their respective transistors Q2, Q3, Q4, Q5, Q6.

Also, each capacitor is coupled through a resistor to the collector of the corresponding transistor in the next or subsequent multivibrator to sense the voltage, and hence the conduction state of that transistor. Thus, the capacitor C1 is coupled through a resistor 101 (and a diode rectifier 102 for reasons to be explained) to the collector of the transistor Q3. Similar connections with resistors 201, 301, 401, 501, 601 (but without the rectifier) are made between the capacitors C2, C3, C4, C5, C6 and the next corresponding transistors Q4, Q5, Q6, Q1, Q2 respectively.

From the description thus far, it will be seen that the three multivibrators, their respective components, and the six capacitors are similarly arranged and connected. The only difference in any connections lies in the use of the isolating diode rectifiers, 19, 102 for a reason that will be explained later.

The operation of the inverter as thus far described will be explained in connection with the waveforms shown and plotted against time in FIGURE 2. Negative-going reference pulses are applied to the frequency reference pulse line 56. Since the inverter produces three phase alternating current, the reference pulses occur at a rate that is six times the desired frequency of the output alternating current. Such pulses may have a duration of about ten microseconds. Thus, if the inverter were to produce 400 cycle alternating current, the reference pulses would occur at a 2400 cycle rate. These pulses are shown at the top in FIGURE 2. The next waveform of FIGURE 2 shows the state of multivibrator 1, and particularly shows when transistor Q1 is on and when transistor Q2 is on. The next two waveforms show the states of multivibrator 2 and multivibrator 3 and their respective transistors. In the waveforms for the multivibrator states, the condition when an odd numbered transistor is conducting has been arbitrarily designated the zero (0) state, and the condition when an even numbered transistor is conducting has been arbitrarily designated the one (1) state for the multivibrator. The lower six waveforms of FIGURE 2 show the charge present at the upper terminal or plate of the six capacitors C1 through C6.

Just after the time $t_0$, multivibrator 1 is in the 0 state, multivibrator 2 is in the 1 state, and multivibrator 3 is in the 0 state. With multivibrators 1 and 3 in the 0 state, and with multivibrator 2 in the 1 state, the capacitor C5 is the only capacitor that can transmit a negative reference pulse to its associated transistor Q5. This is because the capacitor C5 is coupled to the collector of the transistor Q5 which is conducting, and to the collector of the transistor Q1 which is also conducting. The voltages at the collectors of these transistors Q5 and Q1 are almost zero so that there is very little charge across the capacitor C5 as shown just prior to the time $t_1$. As shown by the other waveforms, the capacitors C1, C2, C3, C4, C6 have appreciable positive charge. This positive charge prevents the negative-going reference pulses from switching a transistor off. Thus, at the time $t_1$, the capacitor C5 permits a negative reference pulse to be applied to the base electrode of the transistor Q5 to turn the transistor Q5 off. In accordance with conventional transformer-coupled multivibrator operation, this causes multivibrator 3 to switch from the 0 state to the 1 state with the transistor Q5 turned off and the transistor Q6 turned on. At the time $t_2$, the capacitor C4 (which is coupled to the collectors of the now-conducting transistors Q4, Q6) is in condition to permit a negative pulse to be passed to transistor Q4 and switch multivibrator 2 from the 1 state to the 0 state. At the time $t_3$, the capacitor C1 is in condition to permit a negative pulse to be applied to the transistor Q1 and switch multivibrator 1 from the 0 state to the 1 state. At the time $t_4$, the capacitor C6 is in condition to permit a negative pulse to be applied to the transistor Q6 and switch multivibrator 3 from the 1 state to the 0 state. At the time $t_5$, the capacitor C3 is in condition to permit a negative pulse to be applied to the transistor Q3 and switch multivibrator 2 from the 0 state to the 1 state. And, at the time $t_0'$, the capacitor C2 is in condition to permit a negative pulse to be applied to the transistor Q2 and switch multivibrator 1 from the 1 state to the 0 state. The cycle just described repeats itself again beginning at the time $t_0'$ and continues switching in a similar manner.

The output transformer 11 has its three windings respectively coupled to the undotted end of the main windings 12, 22, 32 or to the collectors of the even numbered transistors Q2, Q4, Q6. The waveforms for the multivibrator states will show that in a cycle from the time $t_0$ to the time $t_0'$, a voltage difference exists between at least two even numbered transistors from which the output is derived. Also, a comparable voltage exists between any two odd numbered transistors. Thus, the output voltage can be combined from these transistor voltages to produce a three-phase alternating current output. The output transformer 11 may have secondary windings (not shown) which can be coupled in Y or delta to a load. Also, an output may be derived by coupling a respective winding to each of the transformers T1, T2, T3, and using these windings to operate bridge-connected switching devices such as power transistors. The inverter operates in a ring or sequential fashion with multivibrator 1 switching, followed by multivibrator 2 switching, followed by multivibrator 3 switching, followed by multivibrator 1 switching, and so on. This sequential operation is why the inverter is sometimes referred to as a ring type inverter.

If a fault develops in the load supplied by the output transformer 11, it is desirable that the output voltage be reduced to a low value or zero as quickly as possible to protect the current control devices in the power circuit or in the multivibrators (these being the transistors Q1 through Q6). In accordance with the invention, this is achieved by a current limit set line 57 which is respectively coupled through diode rectifiers 58, 59, 60 to the collectors of the even numbered transistors Q2, Q4, Q6. Alternatively, a similar connection could be made to the odd numbered transistors Q1, Q3, Q5. The current limit set line 57 is coupled to the collector of a current limit transistor Q7 which is supplied through a resistor 50 with direct current from the positive bus of the direct current supply 10. The emitter of the transmitter Q7 is coupled to the negative bus. The base electrode of the transistor Q7 is coupled to a fault terminal. A controlled rectifier SCR1 is also provided to keep the current limited once the current limit condition is called for. The anode of the controlled rectifier SCR1 is coupled through a diode 55 to the junction of the resistor 103 and the diode rectifier 104. The cathode of the controlled rectifier SCR1 is coupled to the negative bus of the direct current supply 10. The anode of the controlled rectifier SCR1 is provided with positive voltage through a normally closed reset button 53 and a resistor 54. A resistor 52 is coupled between the gate electrode and the cathode of the controlled rectifier SCR1. The gate electrode of the controlled rectifier SCR1 is coupled through a capacitor 51 to the fault terminal.

When a fault or overload develops at any point which warrants protection, a fault signal can be provided and applied to the fault terminal. This fault signal is, for the circuit shown, a positive-going signal that causes the transistor Q7 and the controlled rectifier SCR1 to conduct. When the transistor Q7 conducts, its collector voltage falls to very nearly ground potential. This pulls the current limit set line 57 to very nearly ground potential. This line is connected through diode rectifiers 58, 59, 60 to the collectors of the even numbered transistors Q2, Q4, Q6. Thus the collectors of these transistors are pulled to very nearly ground potential. On those even numbered transistors which were conducting at the time when Q7 conducts, the current limit set line 57 has no effect. Those even numbered transistors which were not conducting when transistor Q7 conducts are caused to conduct by the current limit line 57 forcing the voltage across the transistor to nearly zero and thus forcing the multivibrators to the 1 state. Thus one result of the fault signal at the base of the transistor Q7 is that all even numbered transistors Q2, Q4, Q6 are set into conduction, and all odd numbered transistors Q1, Q3, Q5 are caused to cease conduction by multivibrator action.

The fault signal also causes the controlled rectifier SCR1 to conduct. The conduction of the rectifier SCR1 prevents an output restoration line 100 from having any effect on the capacitor C1, as will be explained. Thus, the capacitor C1 is only affected by the transistor Q1 and the transistor Q3. The effect of the fault signal is shown at the time $t_6$ in FIGURE 2. At the time $t_6$, multivibrator 2 is already in the 1 state with the even numbered transistor Q4 conducting. However, multivibrator 1 and multivibrator 3 are switched to the 1 state as indicated.

With the even numbered transistors Q2, Q4, Q6 conducting, the even numbered capacitors C2, C4, C6 may all pass a negative-going pulse and thus turn off the even numbered transistors Q2, Q4, Q6, and turn on the odd numbered transistors Q1, Q3, Q5 as shown at the time $t_7$. At the time $t_8$, the odd numbered capacitors C1, C3, C5 may pass a negative-going pulse and switch the multivibrator states again so that the odd numbered transistors Q1, Q3, Q5 are turned off and the even numbered transistors Q2, Q4, Q6 are turned on. This continues through the times $t_8$, $t_9$, and so on. Thus, it will be seen that the multivibrators all switch at the same time, this being at one half of the reference frequency pulse rate. Since the outputs are derived from either the even numbered transistors as shown or from the odd numbered transistors, the voltages at the output points are all either zero or are all at some substantially equal maximum value. Thus the voltages between the windings of the output transformer 11 are substantially zero and no output is produced. Thus the current control devices of the inverter system are protected against overload or faults.

In order to permit the inverter to regain normal output, an output restoration line 100 is provided for one of the capacitors, in FIGURE 1 this being capacitor C1. The output restoration line 100 couples the capacitor C1 to the noncorresponding transistor of another multivibrator. In this case, the capacitor C1 is coupled to the even numbered transistor Q6 of multivibrator 3. This output restoration line 100 is coupled to the transistor Q6 through the diode rectifier 104 and the resistor 103. A bleeder resistor 105 is also coupled between the output restoration line 100 and the negative bus of the direct current supply 10. When the controlled rectifier SCR1 is turned on by a fault signal, it continues to conduct and hold the output restoration line 100 at ground so that the capacitor C1 can not receive a positive charge. However, the output restoration line 100 can be made effective by removing this ground. This is done by the pushing of the reset button 53 to cause the controlled rectifier SCR1 to be turned off. When the controlled rectifier SCR1 is turned off (and the next time that the transistor Q6 is turned off, such as illustrated at the time $t_{10}$ in FIGURE 2), the next negative-going pulse applied to the capacitor C1 cannot cause the transistor Q1 to be turned off. Thus, at the time $t_{11}$, multivibrator 1 does not switch states because the transistor Q6 was turned off between the time $t_{10}$ and $t_{11}$ and the capacitor C1 retained its positive charge. And since multivibrator 1 remains in the 0 state, the transistor Q2 remains off and the capacitor C6 maintains its positive charge through the time $t_{12}$. Thus, multivibrator 3 remains in the 1 state through the time $t_{12}$. At the time $t_{13}$, multivibrator 2 does not switch states because the capacitor C4 continues to receive a positive charge from the nonconducting transistor Q6. And, after the time $t_{13}$, normal operation is restored such as explained in connection with the waveforms between the times $t_0$ and $t_0'$.

If, when the reset button 53 was opened, the fault had still been present and the output transformer 11 began to produce an output voltage, the fault signal would have been produced again. The controlled rectifier SCR1 and the transistor Q7 would have been turned on again, and the current limit set line 57 would have caused all of the multivibrators to switch to the 1 state again. The reset button 53 can, of course, be replaced with some automatic device such as a timing relay with its contacts replacing the reset button 53 so as to periodically attempt to turn off the controlled rectifier SCR1.

It will thus be seen that the invention provides means for limiting the output current of a ring type inverter by causing all multivibrators of the inverter to switch in unison or correspondingly, and means for restoring normal ring or sequence switching of the inverter. It will be seen that the circuit is similar for each of the multivibrators with the exception of the capacitor C1. The capacitor C1 is isolated by diode rectifiers 19, 102, 104 so that the capacitor C1 may go positive in response to any one of the transistors Q1, Q3, Q6 being turned off. The isolating diode rectifier 55 is provided so that the controlled rectifier SCR1 will remain turned on despite voltage variations on the transistor Q6.

While the invention has been discussed and explained in only one embodiment, persons skilled in the art will appreciate that modifications may be made. For example, a higher number of phases may be produced by the inverter. And, other devices or arrangements which perform the storage or memory functions of the capacitors C1 through C6 may be utilized in place of these capacitors C1 through C6. Therefore, while the invention has been described with reference to a particular embodiment, it is to be understood that modifications may be made without departing from the spirit of the invention or from the scope of the claims.

What I claim as new and desire to secure by Letters Patent of the United States is:

1. In an inverter for changing direct current to multiphase alternating current, said inverter comprising a plurality of switching circuits each having first and second current control devices, a control circuit comprising a plurality of input means; means respectively coupling each of said input means to one of said current control devices in each of said switching circuits and to a corresponding one of said current control devices in another switching circuit for sensing the state of said one and said corresponding one current control devices; means coupled to a given one of said current control devices in each of said switching circuits for simultaneously causing said given current control devices to have corresponding conductive states; and means for simultaneously applying switching pulses to said input means.

2. In an inverter for changing direct current to multiphase alternating current, said inverter comprising a plurality of switching circuits each having first and second current control devices intercoupled to cause each other to have opposite conduction states, a control circuit comprising a plurality of input elements; means coupling an input element to a respective one of each of said current control devices in each of said switching circuits and to a respective corresponding one of said current control devices in another switching circuit for passing an input pulse in response to said respective one current control device and said respective corresponding one current control device having the same conduction state; means coupled to a comparable one of said current control devices in each of said switching circuits for simultaneously causing said comparable current control devices to have the same conduction states; means for selectively coupling one of said input elements to a noncorresponding one of said current control devices in another of said switching circuits; and means for simultaneously applying input pulses to said input elements.

3. In an inverter comprising N switching circuits for producing N phases of alternating current from direct current, where N is any integer greater than two, each switching circuit having first and second current control devices coupled together so that when one of said current control devices is conducting the other of said current control devices is nonconducting, a control circuit comprising 2 N input devices; means coupling each of said input devices to a respective one of said switching circuits for causing said respective switching circuit to change switching states in response to a switching signal applied thereto; means respectively coupling each of said input devices to a current control device in its respective switching circuit and to the comparable current control device in the sequentially subsequent switching circuit for permitting said switching signal to be operative in response to said current control devices both having the same conduction state; and means coupled to the corresponding current control device in each switching circuit for switching said corresponding current control devices to the same conductive state in response to a fault signal.

4. In an inverter comprising N switching circuits for producing N phases of alternating current from direct current, where N is any integer greater than two, each switching circuit having first and second current control devices coupled together so that when one of said current control devices is conducting the other of said current control devices is nonconducting, a control circuit comprising 2 N input devices; means coupling each of said input devices to said first current control device of said switching circuits for causing said first current control device to have a given state in response to a switching signal applied thereto; means respectively coupling each of said input devices to its associated first current control device and to the first current control device in the sequentially subsequent switching circuit for permitting said switching signal to be operative in response to said associated first current control device and said first current control device in said subsequent switching circuit both being conductive; means coupled to each of said second current control devices for switching said second current control devices to the same conductive state in response to a fault signal; and means coupling one of said input devices to a second current control device in still another switching circuit in response to a restoration signal.

5. In an inverter for changing direct current to three-phase alternating current, said inverter comprising six current control devices, means coupling the first and second current control devices in a first switching circuit so that when one of said current control devices conducts the other of said current control devices is turned off, means coupling the third and fourth current control devices in a second switching circuit so that when one of said current control devices conducts the other of said current control devices is turned off, and means coupling the fifth and sixth current control devices in a third switching circuit so that when one of said current control devices conducts the other of said current control devices is turned off, a control circuit comprising six input devices; means coupling the first input device to said first and third current control devices to sense the state of said first and third current control devices and to permit an input signal to pass in response to both said first and third current control devices being in a first relative state; means coupling the second input device to said second and fourth current control devices to sense the state of said second and fourth current control devices and to permit an input signal to pass in response to both said second and fourth current control devices being in said first relative state; means coupling the third input device to said third and fifth current control devices to sense the state of said third and fifth current control devices and to permit an input signal to pass in response to both said third and fifth current control devices being in said first relative state; means coupling the fourth input device to said fourth and sixth current control devices to sense the state of said fourth and sixth current control devices and to permit an input signal to pass in response to both said fourth and sixth current control devices being in said first relative state; means coupling the fifth input device to said fifth and first current control devices to sense the state of said fifth and first current control devices and to permit an input signal to pass in response to both said fifth and first current control devices being in said first relative state; means coupling the sixth input device to said sixth and second current control devices to sense the state of said sixth and second current control devices and to permit an input signal to pass in response to both said sixth and second current control devices being in said first relative state; means respectively coupling each input device to its like numbered current control device for causing said like numbered current control device to switch states in response to a passed input signal; and means coupled to said first, third, and fifth current control devices for causing said first, third, and fifth current control devices to switch to the same states in response to a fault signal.

6. The control circuit of claim 5 and further comprising means selectively coupling said first input device to said sixth current control device for sensing the state of said sixth current control device and blocking an input signal through said first input device in response to said sixth current control device being in a state opposite said first relative state.

References Cited

UNITED STATES PATENTS

| | | | |
|---|---|---|---|
| 2,899,572 | 8/1959 | Skelton et al. | 307—88.5 X |
| 2,953,735 | 9/1960 | Schmidt | 321—5 |
| 3,069,557 | 12/1962 | Skelton | 307—88.5 |

JOHN F. COUCH, *Primary Examiner.*

W. H. BEHA, *Assistant Examiner.*